(12) United States Patent
Fang

(10) Patent No.: US 12,415,345 B2
(45) Date of Patent: Sep. 16, 2025

(54) COMPOSITE FILMS, AND PREPARATION METHODS AND THE USE THEREOF

(71) Applicant: GUANGZHOU LEHMAN BROTHERS ELECTRONIC TECHNOLOGY CO., LTD., Guangdong (CN)

(72) Inventor: Xiaodong Fang, Guangzhou (CN)

(73) Assignee: GUANGZHOU LEHMAN BROTHERS ELECTRONIC TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 19/176,125

(22) Filed: Apr. 10, 2025

(65) Prior Publication Data

US 2025/0236099 A1     Jul. 24, 2025

Related U.S. Application Data

(63) Continuation-in-part of application No. PCT/CN2024/095810, filed on May 28, 2024.

(30) Foreign Application Priority Data

Apr. 12, 2023 (CN) .............. 202310395560

(51) Int. Cl.
    *B32B 27/08*      (2006.01)
    *B32B 7/12*      (2006.01)
    (Continued)

(52) U.S. Cl.
    CPC ............... *B32B 27/08* (2013.01); *B32B 7/12* (2013.01); *B32B 27/36* (2013.01); *B32B 27/40* (2013.01);
    (Continued)

(58) Field of Classification Search
CPC ........... B32B 3/266; B32B 7/12; B32B 27/08; B32B 27/36; B32B 27/40
See application file for complete search history.

(56) References Cited

U.S. PATENT DOCUMENTS

2007/0256736 A1    11/2007    Tonkovich et al.
2023/0097326 A1*    3/2023    Yu ..................... B32B 27/18
                                                                              428/213

FOREIGN PATENT DOCUMENTS

CN      204020146 U      12/2014
CN      104540878 A      4/2015
(Continued)

OTHER PUBLICATIONS

First Office Action in Chinese Application No. 202310395560.0 mailed on Oct. 21, 2023, 20 pages.

(Continued)

*Primary Examiner* — Zachary M Davis
(74) *Attorney, Agent, or Firm* — PORUS IP LLC

(57) ABSTRACT

A composite film, and preparation method and the use thereof are provided. The composite film includes a first protective layer, a buffer elastic layer, and an impact-hardening layer from top to bottom, a first adhesive layer is arranged between the first protective layer and the buffer elastic layer, the impact-hardening layer includes a non-Newtonian fluid material and an adhesive, and a parts by weight ratio of the non-Newtonian fluid material to the adhesive is 1:(0.6-1.2). The preparation method includes: coating the first adhesive layer onto the first protective layer, and coating the impact-hardening layer on the other side of the buffer elastic layer. The coating the impact-hardening layer includes coating the non-Newtonian fluid material and then coating the adhesive, or mixing and stirring the non-Newtonian fluid material and the adhesive to obtain a (Continued)

mixture and coating the mixture on the other side of the buffer elastic layer.

14 Claims, 1 Drawing Sheet

(51) Int. Cl.
  *B32B 27/36* (2006.01)
  *B32B 27/40* (2006.01)
  *B32B 37/12* (2006.01)
  *B32B 37/26* (2006.01)
  *B32B 37/24* (2006.01)

(52) U.S. Cl.
  CPC .............. *B32B 37/12* (2013.01); *B32B 37/26* (2013.01); *B32B 2037/243* (2013.01); *B32B 2037/268* (2013.01); *B32B 2250/03* (2013.01); *B32B 2250/40* (2013.01); *B32B 2255/10* (2013.01); *B32B 2305/02* (2013.01); *B32B 2307/40* (2013.01); *B32B 2307/558* (2013.01); *B32B 2307/7376* (2023.05)

(56) References Cited

FOREIGN PATENT DOCUMENTS

| CN | 108546324 A | 9/2018 |
| CN | 108878119 A | 11/2018 |
| CN | 210394252 U | 4/2020 |
| CN | 210680622 U | 6/2020 |
| CN | 212504690 U | 2/2021 |
| CN | 113257137 A | 8/2021 |
| CN | 218321205 U | 1/2023 |
| CN | 116355546 A | 6/2023 |

OTHER PUBLICATIONS

The Second Office Action in Chinese Application No. 202310395560.0 mailed on Jan. 6, 2024, 18 pages.
Decision to Grant a Patent in Chinese Application No. 202310395560.0 mailed on Mar. 25, 2024, 4 pages.
International Search Report in PCT/CN2024/095810 mailed on Aug. 28, 2024, 7 pages.
Written Opinion in PCT/CN2024/095810 mailed on Aug. 28, 2024, 8 pages.

* cited by examiner

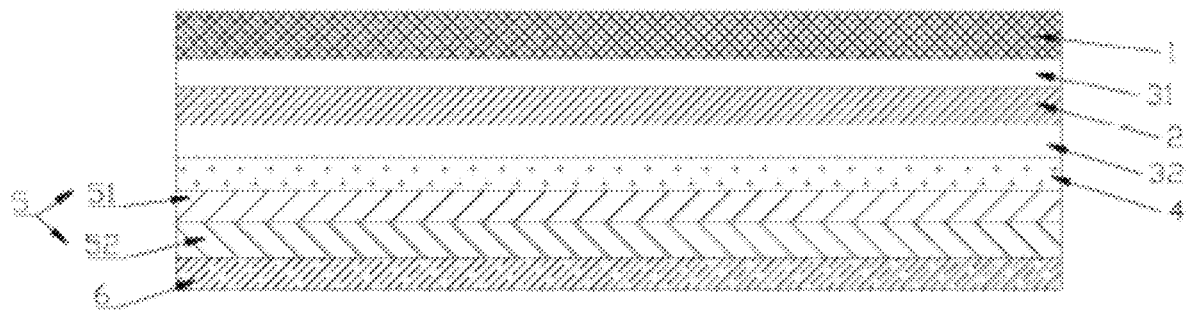

COMPOSITE FILMS, AND PREPARATION METHODS AND THE USE THEREOF

CROSS-REFERENCE TO RELATED APPLICATIONS

This application is a continuation-in-part application of international application No. PCT/CN2024/095810, filed on May 28, 2024, which claims priority to Chinese Patent Application No. 202310395560.0, filed on Apr. 12, 2023, the entire contents of each of which are incorporated herein by reference.

TECHNICAL FIELD

The present disclosure generally relates to the field of film technology, and specifically relates to composite films, and preparation methods and the use thereof.

BACKGROUND

Glass, as a common material, is widely used in daily life. However, in order to prevent the glass from being scratched or abraded, a protective film is often applied to protect the glass from damage.

Generally, there is no protective film on the outer side of the front windshield of automobiles, which makes the vehicle susceptible to external collisions and friction during driving, leading to scratches, cracks, and other problems on the glass surface. In the current design of the front windshield, in order to prevent injury to people inside the vehicle when the glass breaks, a protective film is mainly added to the inner side of the front windshield, and the protective film can prevent the glass fragments from scattering and causing injuries. However, such measures only play a role in protecting the people inside the vehicle, but cannot protect the front windshield from damage.

Patent Publication No. CN218321205U discloses an anti-glare automobile glass protective film, relating to the technical field of automobile supplies. The protective film comprises an anti-glare layer for blocking light to realize the anti-glare function, the anti-glare layer has an anti-scratch layer for preventing stone scratching attached to its upper surface, a second release protective layer for its protecting the anti-scratch layer is attached to its upper side, a reinforcement layer is provided on the lower side of the anti-glare layer, a buffer layer is provided on the lower side of the reinforcement layer, an adhesion layer for adhering to the automotive glass is provided on the lower side of the buffer layer, and a first release protection layer for protecting the adhesion layer is provided on the lower side of the adhesion layer. However, the protective film in this technical solution can only prevent scratches caused by sands and gravels. For the impact on the glass caused by small stones on the ground brought up by vehicles traveling at a high speed on the highway, the strong impact force can easily break through the protective film and hit the front windshield, causing cracks or even rupture. Therefore, there is an urgent need for developing an impact-resistant protective film for glass protection.

SUMMARY

Based on the technical problems existing in the background technology, the present disclosure aims to provide a composite film that can improve the impact resistance of glass.

One aspect of the present disclosure provides a composite film, comprising a first protective layer, a buffer elastic layer, and an impact-hardening layer from top to bottom, wherein a first adhesive layer is arranged between the first protective layer and the buffer elastic layer, the impact-hardening layer includes a non-Newtonian fluid material and an adhesive, and a parts by weight ratio of the non-Newtonian fluid material to the adhesive is 1:(0.6-1.2).

In some embodiments, the buffer elastic layer is provided with a liquid-retaining through-hole array, the liquid-retaining through-hole array having a through-hole diameter of 0.05 mm-0.1 mm.

In some embodiments, the first adhesive layer is an optically clear adhesive (OCA) or a polyurethane (PU) adhesive.

In some embodiments, a thickness of the first protective layer is within a range of 70 μm-200 μm, a thickness of the buffer elastic layer is within a range of 50 μm-100 μm, a thickness of the first adhesive layer is within a range of 20 μm-30 μm, and a thickness of the impact-hardening layer is within a range of 80 μm-120 μm.

In some embodiments, a second adhesive layer and an attachment layer are sequentially arranged between the buffer elastic layer and the impact-hardening layer from top to bottom.

In some embodiments, the second adhesive layer is an optically clear adhesive (OCA); and the attachment layer is a Polyethylene Terephthalate (PET) film or a Polycarbonate (PC) film.

In some embodiments, a thickness of the second adhesive layer is within a range of 15 μm-35 μm; and a thickness of the attachment layer is within a range of 30 μm-70 μm.

Another aspect of the present disclosure provides a method for preparing the above-described composite film, comprising the following steps.

S0: coating the first adhesive layer onto the first protective layer to bond the first protective layer and the buffer elastic layer.

S1: coating the impact-hardening layer on the other side of the buffer elastic layer.

In the S1, the coating the impact-hardening layer on the other side of the buffer elastic layer includes: firstly coating the non-Newtonian fluid material and then coating the adhesive, or mixing and stirring the non-Newtonian fluid material and the adhesive to obtain a mixture and coating the mixture on the other side of the buffer elastic layer.

In some embodiments, in the S1, when the impact-hardening layer is coated using a process of firstly coating the non-Newtonian fluid material and then coating the adhesive, an ambient temperature of coating the non-Newtonian fluid material is within a range of 15° C.-25° C., and a coating speed is within a range of 150 mm/s-200 mm/s.

Another aspect of the present disclosure provides use of the above composite film in an automobile protective film.

Compared with the prior art, the present disclosure has the following beneficial effects.

(1) The provided composite film is an orderly combination of three-layer structure of the first protective layer, the buffer elastic layer, and the impact-hardening layer, which interacts with each other to form a synergistic effect through the respective functions of the three different structures to improve the impact-resistant performance of the composite film formed by the combination, so as to obtain a new type of composite film with impact-resistant performance. The first protective layer firstly bears the impact force, and the deformable buffer elastic layer absorbs the force. The buffer elastic layer absorbs and disperses the impact energy under the action of the impact force transmitted by the first protective layer, so as to reduce the damage of the external impact force to the first protective layer. At the same time, it can further transfer the impact force to the impact-hardening layer. After the impact-hardening layer is subjected to the impact force, due to the special properties of shear hardening of the non-Newtonian fluid material, the impact-hardening layer forms a state with high damping and high viscosity in a short time, so that the shock wave can be better dissipated and absorbed, so as to protect the glass from damage.

(2) When the shock is removed, the impact-hardening layer returns to its original state and no damage is caused to the impact-hardening layer itself. Therefore, the composite film is able to effectively protect the glass many times over, and the impact resistance of the composite film is not significantly reduced.

(3) The method for preparing the composite film is simple and easy to implement, and the production process is simple and suitable for mass production.

BRIEF DESCRIPTION OF THE DRAWINGS

In order to more clearly illustrate the technical solutions in the embodiments or prior art of this disclosure, the accompanying drawings that need to be used in the descriptions of the embodiments or prior art will be briefly described below, and it will be obvious that the accompanying drawings in the following descriptions are only some of the embodiments of this disclosure. For the person of ordinary skill in the field, in the premise of not paying creative labor, it is also possible to obtain other drawings based on these drawings.

FIG. 1 shows a longitudinal sectional view of a composite film of Example 1.

In the FIG. 1: 1—a first protective layer; 2—a buffer elastic layer; 31—a first adhesive layer; 32—a second adhesive layer; 4—an attachment layer; 5—an impact-hardening layer; 51—a non-Newtonian fluid material layer; 52—an adhesive layer; and 6—a release film layer.

DETAILED DESCRIPTION

The present disclosure is further elaborated below in connection with some embodiments of the present disclosure. These embodiments are only used to illustrate the present disclosure and are not intended to limit the scope of the present disclosure. The experimental methods in the following embodiments, for which specific conditions are not indicated, are generally in accordance with the conventional conditions in the field or the conditions recommended by the manufacturer; and the used raw materials, the used reagents, etc., if not otherwise indicated, are raw materials and reagents that can be obtained from the conventional market and other commercial means. Any non-substantial changes and substitutions made by a person skilled in the art on the basis of the present disclosure fall within the protection scope of the present disclosure herein.

Embodiments of the present disclosure provide a composite film. As shown in FIG. 1, the composite film includes a first protective layer 1, a buffer elastic layer 2, and an impact-hardening layer 5 in a laminated arrangement (e.g., arranged sequentially from top to bottom in FIG. 1).

The first protective layer 1, the buffer elastic layer 2, and the impact-hardening layer 5 are connected to each other by an adhesive. The first protective layer 1 is a film layer that is directly subjected to the impact force, the buffer elastic layer 2 is a film layer that partially absorbs and disperses the impact energy, and the impact-hardening layer 5 is a film layer that dissipates and finally absorbs the impact energy.

When the composite film is subjected to an impact force, the first protective layer 1 firstly withstands the impact force and transmits the impact force to the buffer elastic layer 2, and the buffer elastic layer 2 can absorb and disperse the impact energy to reduce the destructive effect of the external impact force on the first protective layer 1. At the same time, it can also further transmit the impact force to the impact-hardening layer 5. After being subjected to the impact force, the impact-hardening layer 5 can form a state with high damping and high viscosity in a short time, enabling the shock wave to be better dissipated and absorbed. The interaction of the first protective layer 1, the buffer elastic layer 2, and the impact-hardening layer 5 can form a synergistic effect, thereby improving the impact-resistant performance of the formed composite film.

In some embodiments, a thickness of the first protective layer 1 is within a range of 70 μm-200 μm. In some embodiments, the thickness of the first protective layer 1 is within the range of 80 μm-190 μm. In some embodiments, the thickness of the first protective layer 1 is within the range of 90 μm-180 μm. In some embodiments, the thickness of the first protective layer 1 is within the range of 100 μm-170 μm. In some embodiments, the thickness of the first protective layer 1 is within the range of 110 μm-160 μm. In some embodiments, the thickness of the first protective layer 1 is within the range of 120 μm-150 μm. In some embodiments, the thickness of the first protective layer 1 is within the range of 130 μm-140 μm. In some embodiments, the thickness of the first protective layer 1 is 70 μm, 80 μm, 90 μm, 100 μm, 110 μm, 120 μm, 130 μm, 140 μm, 150 μm, 160 μm, 170 μm, 180 μm, 190 μm, 200 μm, or the like.

The buffer elastic layer 2 absorbs and disperses impact energy. In some embodiments, a thickness of the buffer elastic layer 2 is within a range of 50 μm-100 μm. In some embodiments, the thickness of the buffer elastic layer 2 is within the range of 60 μm-90 μm. In some embodiments, the thickness of the buffer elastic layer 2 is within the range of 70 μm-80 μm. In some embodiments, the thickness of the buffer elastic layer 2 is 50 μm, 60 μm, 70 μm, 80 μm, 90 μm, 100 μm, or the like.

In some embodiments, the buffer elastic layer 2 is provided with a liquid-retaining through-hole array (not shown in the FIG. 1), which is used to allow the adhesive of the uneven adhesive layer to flow towards the through-hole direction in the liquid-retaining through-hole array and fill the through-hole during the coating and pressing process, making the bonding of the composite film smooth, improving the uniformity of the force on the composite film, and further enhancing the durability of the composite film. In some embodiments, a through-hole diameter of the liquid-retaining through-hole array is within the range of 0.05 mm-0.1 mm. In some embodiments, the through-hole diameter of the liquid-retaining through-hole array is within the range of 0.06 mm-0.09 mm. In some embodiments, the through-hole diameter of the liquid-retaining through-hole array is within the range of 0.07 mm-0.08 mm. In some embodiments, the through-hole diameter of the liquid-retaining through-hole array is 0.05 mm, 0.06 mm, 0.07 mm, 0.08 mm, 0.09 mm, 0.1 mm, etc.

The first adhesive layer 31 is arranged between the first protective layer 1 and the buffer elastic layer 2 for bonding the first protective layer 1 and the buffer elastic layer 2. In some embodiments, the first adhesive layer 31 is an optically clear adhesive (OCA) or a polyurethane (PU) adhesive.

In some embodiments, a thickness of the first adhesive layer 31 is within a range of 20 μm-30 μm. In some embodiments, the thickness of the first adhesive layer 31 is within the range of 21 μm-29 μm. In some embodiments, the thickness of the first adhesive layer 31 is within the range of 22 μm-28 μm. In some embodiments, the thickness of the first adhesive layer 31 is within the range of 23 μm-27 μm. In some embodiments, the thickness of the first adhesive layer 31 is within the range of 24 μm-26 μm. In some embodiments, the thickness of the first adhesive layer 31 is 20 μm, 21 μm, 22 μm, 23 μm, 24 μm, 25 μm, 26 μm, 27 μm, 28 μm, 29 μm, 30 μm, etc.

In some embodiments, a thickness of the impact-hardening layer 5 is within a range of 80 μm-120 μm. In some embodiments, the thickness of the impact-hardening layer 5 is within the range of 85 μm-115 μm. In some embodiments, the thickness of the impact-hardening layer 5 is within the range of 90 μm-110 μm. In some embodiments, the thickness of the impact-hardening layer 5 is within the range of 95 μm-105 μm. In some embodiments, the thickness of the impact-hardening layer 5 is within the range of 95 μm-100 μm. In some embodiments, the thickness of the impact-hardening layer 5 is 80 μm, 85 μm, 90 μm, 95 μm, 100 μm, 105 μm, 110 μm, 115 μm, 120 μm, etc.

The impact-hardening layer 5 includes a non-Newtonian fluid material and an adhesive. A grade of the non-Newtonian fluid material is FX-480 from Dongguan Qinghe Yanchuang Technology Co., Ltd. The adhesive includes acrylic adhesive. Because of the special property of shear hardening of the non-Newtonian fluid material, after being subjected to an impact force, the impact-hardening layer 5 can form a state with high damping and high viscosity in a short time, so as to enable the shock wave to be better dissipated and absorbed to protect the equipment to which the composite film is applied. When the impact force is withdrawn, the impact-hardening layer 5 can return to its original state without suffering any damage, which further improves the stability of the composite film.

A parts by weight ratio of the non-Newtonian fluid material to the adhesive is 1:(0.6-1.2). In some embodiments, the parts by weight ratio of the non-Newtonian fluid material to the adhesive is 1:(0.6-1.1). In some embodiments, the parts by weight ratio of the non-Newtonian fluid material to the adhesive is 1:(0.6-1.0). In some embodiments, the parts by weight ratio of the non-Newtonian fluid material to the adhesive is 1:(0.6-0.9). In some embodiments, the parts by weight ratio of the non-Newtonian fluid material to the adhesive is 1:(0.6-0.8). In some embodiments, the parts by weight ratio of the non-Newtonian fluid material to the adhesive is 1:(0.6-0.7). In some embodiments, the parts by weight ratio of the non-Newtonian fluid material to the adhesive is 1:(0.7-1.2). In some embodiments, the parts by weight ratio of the non-Newtonian fluid material to the adhesive is 1:(0.8-1.2). In some embodiments, the parts by weight ratio of the non-Newtonian fluid material to the adhesive is 1:(0.9-1.2). In some embodiments, the parts by weight ratio of the non-Newtonian fluid material to the adhesive is 1:(1.0-1.2). In some embodiments, the parts by weight ratio of the non-Newtonian fluid material to the adhesive is 1:(1.1-1.2). In some embodiments, the parts by weight ratio of the non-Newtonian fluid material to the adhesive is 1:(0.7-1.1). In some embodiments, the parts by weight ratio of the non-Newtonian fluid material to the adhesive is 1:(0.8-1.0). In some embodiments, the parts by weight ratio of the non-Newtonian fluid material to the adhesive is 1:(0.9-1.0). In some embodiments, the parts by weight ratio of the non-Newtonian fluid material to the adhesive is 1:0.6, 1:0.7, 1:0.8, 1:0.9, 1:1.0, 1:1.1, 1:1.2, or the like.

In some embodiments, as shown in FIG. 1, a second adhesive layer 32 and an attachment layer 4 are sequentially arranged between the buffer elastic layer 2 and the impact-hardening layer 5 from top to bottom. The second adhesive layer 32 is used to bond the buffer elastic layer 2 and the impact-hardening layer 5.

In some embodiments, the second adhesive layer 32 is an OCA. In some embodiments, a thickness of the second adhesive layer 32 is within a range of 15 μm-35 μm. In some embodiments, the thickness of the second adhesive layer 32 is within the range of 20 μm-30 μm. In some embodiments, the thickness of the second adhesive layer 32 is 15 μm, 18 μm, 20 μm, 22 μm, 25 μm, 28 μm, 30 μm, 32 μm, 35 μm, etc.

The attachment layer is a film layer that facilitates the coating and attachment of non-Newtonian fluid materials such as the impact-hardening layer 5 or the non-Newtonian fluid material layer 51. In some embodiments, the attachment layer 4 is a Polyethylene Terephthalate (PET) film or a Polycarbonate (PC) film. In some embodiments, a thickness of the attachment layer 4 is within a range of 30 μm-70 μm. In some embodiments, the thickness of the attachment layer 4 is within the range of 35 μm-65 μm. In some embodiments, the thickness of the attachment layer 4 is within the range of 40 μm-60 μm. In some embodiments, the thickness of the attachment layer 4 is within the range of 45 μm-55 μm. In some embodiments, the thickness of the attachment layer 4 is within the range of 45 μm-50 μm. In some embodiments, the thickness of the attachment layer 4 is 30 μm, 35 μm, 40 μm, 45 μm, 50 μm, 55 μm, 60 μm, 65 μm, 70 μm, or the like.

Embodiments of the present disclosure also provide use of the aforementioned composite film in an automobile protective film.

By adjusting the parts by weight ratio of the non-Newtonian fluid material to the adhesive in the composite film, the composite film can be made to have different properties (e.g., transient impact resistance, long term usability, flexibility) to meet different usage requirements. In some embodiments, a preset table is constructed through experiments. The preset table reflects the correspondence between the properties of the composite film (e.g., instantaneous impact resistance, long-term usability, flexibility) and the parts by weight ratio of the non-Newtonian fluid material to the adhesive in the composite film. In some embodiments, long-term usability may be understood as stability. Through this preset table, a preferred parts by weight ratio of the non-Newtonian fluid material to the adhesive in the composite film can be obtained, thereby meeting different usage requirements.

In some embodiments, in high-impact protection applications, the user places more value on instantaneous impact resistance and less on long-term usability. The parts by weight ratio of the non-Newtonian fluid material to the adhesive in the composite film may be relatively large, resulting in a composite film with superior instantaneous impact resistance.

Embodiments of the present disclosure also provide use of a composite film in a ballistic material. In some embodiments, the ballistic material may be used to make, for example, a ballistic mask, a ballistic shield, a ballistic vest, or the like. When applied to the ballistic material, the parts by weight ratio of the non-Newtonian fluid material to the adhesive in the impact-hardening layer 5 of the composite film is within the range of 1:(0.6-0.8).

In some embodiments, the parts by weight ratio of the non-Newtonian fluid material to the adhesive is within the range of 1:(0.6-0.75). In some embodiments, the parts by weight ratio of the non-Newtonian fluid material to the adhesive is within the range of 1:(0.6-0.7). In some embodiments, the parts by weight ratio of the non-Newtonian fluid material to the adhesive is within the range of 1:(0.6-0.65). In some embodiments, the parts by weight ratio of the non-Newtonian fluid material to the adhesive is within the range of 1:(0.65-0.8). In some embodiments, the parts by weight ratio of the non-Newtonian fluid material to the adhesive is within the range of 1:(0.7-0.8). In some embodiments, the parts by weight ratio of the non-Newtonian fluid material to the adhesive is within the range of 1:(0.75-0.8). In some embodiments, the parts by weight ratio of the non-Newtonian fluid material to the adhesive is 1:0.6, 1:0.65, 1:0.7, 1:0.75, 1:0.8, etc.

In some embodiments, for electronics used more frequently, users may place more value on long-term usability and flexibility. The parts by weight ratio of the non-Newtonian fluid material to the adhesive in the composite film is relatively small, allowing for better long-term usability and flexibility of the obtained composite film.

Embodiments of the present disclosure also provide use of the composite film in an electronic screen protective film. When applied to an electronic screen protective film, the parts by weight ratio of the non-Newtonian fluid material to the adhesive in the impact-hardening layer 5 of the composite film is within the range of 1:(1-1.2). In some embodiments, the parts by weight ratio of the non-Newtonian fluid material to the adhesive is within the range of 1:(1-1.15). In some embodiments, the parts by weight ratio of the non-Newtonian fluid material to the adhesive is within the range of 1:(1-1.1). In some embodiments, the parts by weight ratio of the non-Newtonian fluid material to the adhesive is within the range of 1:(1-1.05). In some embodiments, the parts by weight ratio of the non-Newtonian fluid material to the adhesive is within the range of 1:(1.05-1.2). In some embodiments, the parts by weight ratio of the non-Newtonian fluid material to the adhesive is within the range of 1:(1.1-1.2). In some embodiments, the parts by weight ratio of the non-Newtonian fluid material to the adhesive is within the range of 1:(1.15-1.2). In some embodiments, the parts by weight ratio of the non-Newtonian fluid material to the adhesive is 1:1, 1:1.05, 1:1.1, 1:1.15, 1:1.2, or the like.

In some embodiments, the non-Newtonian fluid material also include a first reinforcing agent for enhancing the performance of the composite film (e.g., delaying performance decay to improve stability, improving impact resistance, etc.). In some embodiments, the first reinforcing agent includes carbon nanotubes (also referred to as first carbon nanotubes) or graphene sheets.

In some embodiments, the first reinforcing agent is in directional alignment within a non-Newtonian fluid material. In some embodiments, directional alignment refers to an ordered arrangement of the first enhancing agent within the non-Newtonian fluid material in a particular direction. For example, the first reinforcing agent is orderly distributed within the non-Newtonian fluid material in a vertical direction (or in a vertical state). The first reinforcing agent can build an efficient stress transfer and energy dissipation network in the vertical direction. When the impact force acts in the vertical direction of the composite film (or the perpendicular direction, which may be understood as the impact force being perpendicular to the composite film), the directionally aligned first reinforcing agent can quickly disperse the impact force, thus improving the impact resistance of the composite film in the vertical direction.

The first carbon nanotubes have ultra-high strength and modulus as well as unique one-dimensional nanostructures, which enables them to be homogeneously dispersed in a non-Newtonian fluid material to form an effective reinforcement network. The first carbon nanotubes can have strong interactions (e.g., van der Waals forces, IT-TT stacking interaction, etc.) with molecules of the non-Newtonian fluid material. These interactions can increase the contact area and binding force between the non-Newtonian fluid material and the adhesive, as well as other film layers (e.g., the attachment layer 4), thereby increasing the interfacial bonding strength of the non-Newtonian fluid material. In addition, the high aspect ratio of the first carbon nanotubes enables them to effectively transfer stress, avoiding stress concentration at the interface from causing bonding failure. When the non-Newtonian fluid material is deformed due to an impact force, the first carbon nanotubes can disperse the stress uniformly, making the bonding between the non-Newtonian fluid material and the adhesive as well as the other film layers more stable, and further improving the interfacial bonding strength of the non-Newtonian fluid material and delaying the performance decay of the composite film.

In some embodiments, the first reinforcing agent may be directionally aligned within a non-Newtonian fluid material by a magnetic field.

In some embodiments, the adhesive also includes a second reinforcing agent for enhancing the performance of the composite film (e.g., delaying performance decay to improve stability, etc.). In some embodiments, the second reinforcing agent includes at least one of an antioxidant or an anti-UV agent.

In some embodiments, the antioxidant includes, but is not limited to, a hindered phenolic antioxidant. In some embodiments, the hindered phenolic antioxidant includes, but is not limited to, 2,6-di-tert-butyl-4-methylphenol. The antioxidant can not only effectively inhibit the oxidation of the adhesive in the air, but also catch free radicals to prevent the oxidative chain reaction, so as to stabilize the chemical structure of the adhesive and further improve the stability of the composite film.

In some embodiments, the anti-ultraviolet agent includes, but is not limited to, benzophenone-type anti-ultraviolet agents. In some embodiments, the benzophenone-type anti-ultraviolet agent includes, but is not limited to, benzophenone-3, benzophenone-4, or benzophenone-5. The anti-ultraviolet agent is capable of absorbing ultraviolet light, preventing degradation of the adhesive due to ultraviolet light irradiation, and further improving the stability of the composite film.

In some embodiments, the composite film also includes a performance monitoring layer (not shown in the FIG. 1) for monitoring the performance of the composite film or changes in performance of the composite film (e.g., the degree of performance decay). In some embodiments, the performance monitoring layer may be arranged between the buffer elastic layer 2 and the impact-hardening layer 5. For example, the performance monitoring layer may be arranged between the impact-hardening layer 5 and the attachment layer 4. As an example, the performance monitoring layer is bonded between the impact-hardening layer 5 and the attachment layer 4 by an adhesive. In some embodiments, the performance monitoring layer is also integrated into the buffer elastic layer 2 or the impact-hardening layer 5.

Exemplarily, components of the performance monitoring layer (e.g., in a piezoelectric film, carbon nanotubes, or graphene) are mixed in components of the buffer elastic layer 2 or components of the impact-hardening layer 5.

In some embodiments, the performance monitoring layer includes one of a piezoelectric film, carbon nanotubes (also referred to as second carbon nanotubes), or graphene. The first carbon nanotubes and the second carbon nanotubes are the same or different in size, property, or the like. The performance monitoring layer is configured to generate an electrical signal when being subjected to an impact force and send the electrical signal to a processing component.

In some embodiments, the processing component is integrated into any of the hardware devices in the composite film applications. For example, the processing component is located in the dashboard of a vehicle. In some embodiments, electrode interfaces are provided on the performance monitoring layer. The processing component and the performance monitoring layer are electrically connected. For example, the processing component and the performance monitoring layer are electrically connected by a wire. One end of the wire is connected to a conductive network of the performance monitoring layer, and the other end is connected to a signal input pin of the processing component.

The processing component is configured to: record the number of impact forces to which the performance monitoring layer is subjected and an electrical signal generated by each impact force to which the performance monitoring layer is subjected. In some embodiments, the processing component determines, based on a change in the received electrical signals, whether or not the performance monitoring layer is subjected to an impact force. For example, the processing component determines that the performance monitoring layer is subjected to a single impact force when a voltage value of the electrical signal exceeds a predetermined voltage value. As another example, when there is a sudden increase in the voltage value of the electrical signal (or understood that the voltage value increases by more than 50%), the processing component determines that the performance monitoring layer is subjected to an impact force. When it is determined that the performance monitoring layer is subjected to an impact force, the processing component increases the number of impact forces by one to record the number of the impact forces to which the performance monitoring layer is subjected.

The processing component is also configured to: determine a performance decay index of the composite film based on the number of impact forces to which the performance monitoring layer is subjected and an electrical signal generated by each impact force to which the performance monitoring layer is subjected. In some embodiments, determining the performance decay index of the composite film based on the number of impact forces to which the performance monitoring layer is subjected and the electrical signal generated by each impact force to which the performance monitoring layer is subjected includes: determining, based on the electrical signal generated by each impact force to which the performance monitoring layer is subjected to, an energy of the impact force to which the performance monitoring layer is subjected to; and determining a performance decay index of the composite film based on the number of impact forces to which the performance monitoring layer is subjected and the energy of the impact force to which the performance monitoring layer is subjected to. The performance decay index may be used to measure the extent to which the performance of the composite film declines over time.

In some embodiments, upon receiving the electrical signals, the processing component extracts the electrical signal features and determine the energy of each impact force based on a relationship between the electrical signal features and the energy of the impact forces. In some embodiments, the electrical signal features include, but are not limited to, an electrical signal peak voltage, an electrical signal integral value, or the like. In some embodiments, a first relationship model between the electrical signal features and the energy of the impact forces are predetermined. In some embodiments, the first relationship model includes a statistical model, an empirical model, a model determined by modeling, a model determined by data fitting, a machine learning model, etc. The electrical signal features are input into the first relationship model, and the first relationship model outputs an energy of the impact force corresponding to the electrical signal feature. As an example, the relationship between the energy of the impact force E and the peak voltage of the electrical signal V may be expressed as $E=aV^2+bV+c$, where a, b, and c are constants, respectively.

In some embodiments, a second relationship model between the number of impact forces to which the performance monitoring layer is subjected, the energy of each impact, and a performance decay index of the composite film are predetermined. In some embodiments, the second relationship model includes a statistical model, an empirical model, a model determined by modeling, a model determined by data fitting, a machine learning model, etc. The number of impact forces to which the performance monitoring layer is subjected and the energy of each impact are input into the second relationship model, and the second relationship model outputs the performance decay index of the composite film.

As an example, the performance decay index D may be expressed as $D=\Sigma_{i=1}^{n}(Wi*Ei)/n$, where n is the number of impact forces to which the performance monitoring layer is subjected, Ei is the energy of the ith impact force, and Wi is a weight coefficient of the energy of the ith impact force, which is a constant.

In some embodiments, the processing component calculates a performance decay index of the composite film in real time. Through the performance decay index, the degree of performance decay of the composite film may be determined to facilitate the user in deciding whether the device to which the composite film is applied (for example, automotive protective film, electronic screen protective film, ballistic equipment, or the like) needs to be replaced in a timely manner.

In some embodiments, the processing component includes a central processing unit (CPU), an application-specific integrated circuit (ASIC), an application-specific instruction set processor (ASIP) microprocessor, or any combination thereof.

In some embodiments, the composite film (or the device to which the composite film is applied) also includes a display component for displaying the performance of the composite film (e.g., a performance decay index). The display component may be electrically connected to the processing component. The display component may be integrated into any of the hardware devices in the composite film applications. In some embodiments, the display component includes a liquid crystal display, a plasma display, a light emitting diode display, or any combination thereof.

In some embodiments, the processing component maps the performance decay index of the composite film to a different color and send it to the display component to facilitate the user in determining whether to replace the device to which the composite film is applied. For example, when the performance decay index D is in the range of 0-0.2, the display component may be mapped to green, indicating that the composite film has good performance. When the performance decay index D is in the range of 0.2-0.5, the display component may be mapped to yellow, indicating that the composite film is beginning to experience a certain degree of performance decay. When the performance decay index D is in the range of 0.5-0.8, the display component may be mapped to orange, indicating that the performance decay of the composite film is more significant. When the performance decay index D is greater than 0.8, the display component may be mapped to red, indicating that the performance of the composite film has severely degraded and the composite film needs to be replaced in a timely manner.

Embodiments of the present disclosure also provide a method for preparing the aforementioned composite film. The method includes: S0: coating the first adhesive layer 31 onto the first protective layer 1 to bond the first protective layer 1 and the buffer elastic layer 2; S1: coating the impact-hardening layer 5 on the other side of the buffer elastic layer 2. In some embodiments, in the S1, the coating the impact-hardening layer 5 on the other side of the buffer elastic layer includes mixing and stirring the non-Newtonian fluid material and the adhesive to obtain a mixture and coating the mixture on the other side of the buffer elastic layer 2.

In some embodiments, in S1, the non-Newtonian fluid material is firstly coated on the buffer elastic layer 2 to form a non-Newtonian fluid material layer 51, and then the adhesive is coated on the non-Newtonian fluid material layer 51 to form an adhesive layer 52. The non-Newtonian fluid material layer 51 and the adhesive layer 52 together serve as the impact-hardening layer 5. The non-Newtonian fluid material layer 51 includes the non-Newtonian fluid material. The adhesive layer 52 includes the adhesive.

In some embodiments, in S1, the second adhesive layer 32 is firstly coated on the buffer elastic layer 2, and then the attachment layer 4 is coated on the second adhesive layer 32, so that the second adhesive layer 32 and the attachment layer 4 are disposed between the buffer elastic layer 2 and the impact-hardening layer 5.

Related descriptions regarding the first protective layer 1, the buffer elastic layer 2, the first adhesive layer 31, the second adhesive layer 32, the attachment layer 4, and the impact-hardening layer 5 may be found in relevant parts of the present disclosure (e.g., FIG. 1 and its related descriptions).

The preparation method of the composite film provided in the embodiments of the present disclosure is simple and easy to implement, and the production process is simple and suitable for mass production.

The source of the raw material in examples and comparative examples of the present disclosure is shown in Table 1 below.

TABLE 1

Source and model of raw material in examples and comparative example

| Name of raw material | Model | Manufacturer | Note |
|---|---|---|---|
| PC film | MX-C572 | Dongguan Mingxin Polymer Technology Co., Ltd. | Thickness of 150 μm |
| PET film | MX-T620 | Dongguan Mingxin Polymer Technology Co., Ltd. | Thickness of 188 μm and 50 μm. |
| OCA | AC04 | Shenzhen Jingheng Optoelectronics Technology Co., Ltd. | Light transmittance of 95% or more |
| Thermoplastic polyurethanes (TPU) film | | Dongguan Dingyue New Material Co., Ltd. | Thickness of 100 μm |
| PU adhesive | AE15 | Shenzhen Jingheng Optoelectronics Technology Co., Ltd. | |
| Non-Newtonian fluid material | FX-480 | Dongguan Qinghe Yanchuang Technology Co., Ltd. | |
| adhesive | KM-420 | Dongguan Qinghe Yanchuang Technology Co., Ltd. | Acrylic adhesive |

EXAMPLES

Example 1

A method for preparing a composite film, comprising the following steps.

Step 1: materials was prepared, the first protective layer 1 was a PET film with a thickness of 188 μm, the buffer elastic layer 2 was a TPU film, the first adhesive layer 31 and the second adhesive layer 32 were OCA, and the attachment layer 4 was a PET film with a thickness of 50 μm.

Step 2: the materials were set up in a coating machine in a dust-free coating environment (the same below), the first protective layer and the buffer elastic layer were bonded firstly at a coating speed of 500 mm/s to obtain a first composite film, and the thickness of the first adhesive layer was about 25 μm.

Step 3: the buffer elastic layer of the first composite film and the attachment layer were bonded at a coating speed of 500 mm/s to obtain a second composite film, and the thickness of the second adhesive layer was about 25 μm.

Step 4: the impact-hardening layer 5 includes the non-Newtonian fluid material layer 51 and the adhesive layer 52 stacked together. The non-Newtonian fluid material layer 51 was coated firstly on the side of the attachment layer of the second composite film at the ambient temperature of 20° C. and a coating speed of 200 mm/s, and then the adhesive layer 52 was coated on the non-Newtonian fluid material layer 51 at a heating temperature of 80° C. and a coating speed of 200 mm/s. The thickness of the non-Newtonian fluid material layer 51 was about 40 μm and the thickness of the adhesive layer 52 was about 40 μm, and the parts by weight ratio of the non-Newtonian fluid material layer 51 and the adhesive layer 52 was 1:0.6.

Step 5: a release film layer 6 was attached to the other side of the adhesive layer 52.

Step 6: the formed film was dried naturally for 6 h to obtain the composite film.

Example 2

A method for preparing the composite film, the steps and the reagents and process parameters used in the steps were the same as those of Example 1, with the difference that the thickness of the non-Newtonian fluid material layer was about 40 μm, the thickness of the adhesive layer was about 80 μm, and the parts by weight ratio of the non-Newtonian fluid material layer and the adhesive layer was 1:1.2.

Example 3

A method of preparing the composite film, the steps and the reagents and the process parameters used in the steps were the same as those of Example 1, with the difference that the non-Newtonian fluid material and the adhesive were mixed at the parts by weight ratio of 1:1 and then coated as the impact-hardening layer on the buffer elastic layer, and the thickness of the buffer elastic layer was about 100 μm.

Example 4

A method for preparing the composite film, the steps and the reagents and process parameters used in the steps were the same as those of Example 1, with the difference that the TPU membrane was provided with the liquid-retaining through-hole array, the liquid-retaining through-hole array having the through-hole diameter of 0.1 mm, with the through-holes separated by 0.5 mm.

Example 5

A method for preparing the composite film, the steps and the reagents and process parameters used in the steps were the same as those of Example 1, with the difference that the first protective layer was the PC film with a thickness of 70 μm.

Example 6

A method for preparing the composite film, the steps and the reagents and the process parameters used in the steps were the same as in Example 5, with the difference that the first adhesive layer and the second adhesive layer were PU adhesive, the thickness of the first adhesive layer was about 20 μm, and the thickness of the second adhesive layer was about 15 μm.

Comparative Example 1

A method of preparing a composite film, the steps and the reagents and process parameters used in the steps were the same as those of Example 1, with the difference that a non-Newtonian fluid material was not coated.
Performance Test
1. Impact resistance test: the composite film was cut into films with a size of 20 cm*20 cm, the films were bonded to the automotive glass, the surface of the films was kept clean and flat, and there is no obvious residue bubble. The fixture was used to fix the automotive glass, a 100 g steel ball dropped onto the composite film from the height of 1.5 meters, and the damage of the composite film and the glass was observed.
2. Durability test: the impact resistance test was repeated for 10 times to observe the damage of the composite film and the glass.
3. Light transmittance: the light transmittance tester was used to detect the light transmittance of the composite film.

The results of the above performance tests are shown in Table 2.

TABLE 2

Results of impact resistance test and light transmittance of the composite films in Examples 1-6 and Comparative Example 1

| Testing item | Surface condition of the composite film in impact resistance test | Surface condition of glass in impact resistance test | Durability | Light transmittance |
|---|---|---|---|---|
| Example 1 | No cracks | No cracks | White spots appeared on the composite film at the 5th test, no effect on the glass | 93% |
| Example 2 | No cracks | No cracks | Cracks appeared on the composite film at the 5th test, no effect on the glass | 89% |
| Example 3 | No cracks | No cracks | No effect on the composite film and glass | 87% |
| Example 4 | No cracks | No cracks | White spots appeared on the composite film at the 8th test, no effect on the glass | 90% |
| Example 5 | No cracks | No cracks | White spots appeared on the composite film at the 8th test, no effect on the glass | 95% |
| Example 6 | No cracks | No cracks | No effect on the composite film and glass | 94% |
| Ratio 1 | Obvious cracks | Obvious cracks | — | 94% |

In the specific embodiment of the present disclosure, an impact resistance test is used to simulate the impact on the glass by small stones on the ground brought up by vehicles traveling at a high speed on a highway. It can be seen from the above Examples 1-6 that the prepared composite film has relatively excellent impact resistance, there is no visible cracks on the surface of the composite films and the surface of the glass, and the light transmittances of all the composite films are higher than 85%, meeting the requirements for the use of the front windshield. After many tests, although white spots or cracks appear on the composite film, the glass itself remains unaffected, and the composite film can be repeatedly used to provide protection.

By comparing the data of Example 2, it can be clearly observed that increasing the thickness of the adhesive decreases the light transmittance, while having little effect on durability.

By comparing the data of Example 3, it can be clearly observed that the process of mixing and then coating can significantly improve the durability of the composite film. The reason is that the process of mixing and then coating can reduce the unevenness caused by the delamination of the non-Newtonian fluid material and the adhesive, thereby making the stress on the composite film more uniform and improving the durability of the composite film. However, mixing the non-Newtonian fluid material and the adhesive cause the light transmittance to decrease significantly because the two materials fill each other's structural voids during the mixing process. In addition, the process of mixing and then coating can reduce a time-consuming coating process and improve the production efficiency of the composite film.

By comparing the data of Example 4, it can be clearly found that the liquid-retaining through-hole array facilitates the flow of the adhesive of the uneven portion of the adhesive layer towards the through-hole direction in the liquid-retaining through-hole array and filling of the adhesive to the through-hole during the coating and pressing process. As a result, the bonding of the composite film is flat, the stress uniformity of the composite membrane is improved, and the durability of the composite film is further improved.

By comparing the data of Example 5, it can be found that even though the thickness of the PC film is smaller, the durability of the composite film prepared by PC film is better due to its superior performance compared to the PET film. However, the cost of the PC film is relatively higher.

Lastly, it should be noted that the above embodiments are only used to illustrate the technical solutions of the present disclosure rather than to limit the scope of protection of the present disclosure, and not withstanding that the present disclosure has been described in detail with reference to the preferred embodiments, it should be understood by persons of ordinary skill in the art that the technical solutions of the present disclosure is modified or equivalently replaced without departing from the substance and scope of the present disclosure.

What is claimed is:

1. A composite film, comprising:
   a first protective layer, a buffer elastic layer, and an impact-hardening layer from top to bottom, wherein a first adhesive layer is arranged between the first protective layer and the buffer elastic layer; wherein
   the impact-hardening layer comprises a non-Newtonian fluid material and an adhesive and a parts by weight ratio of the non-Newtonian fluid material to the adhesive is 1:(0.6-1.2), wherein the impact-hardening layer is obtained by mixing the non-Newtonian fluid material and the adhesive and coating; and
   the buffer elastic layer is provided with a liquid-retaining through-hole array, the liquid-retaining through-hole array having a through-hole diameter of 0.05 mm-0.1 mm.

2. The composite film of claim 1, wherein the first adhesive layer is an optically clear adhesive (OCA) or a polyurethane (PU) adhesive.

3. The composite film of claim 1, wherein a thickness of the first protective layer is within a range of 70 µm-200 µm, a thickness of the buffer elastic layer is within a range of 50 µm-100 µm, a thickness of the first adhesive layer is within a range of 20 µm-30 µm, and a thickness of the impact-hardening layer is within a range of 80 µm-120 µm.

4. The composite film of claim 1, wherein a second adhesive layer and an attachment layer are sequentially arranged between the buffer elastic layer and the impact-hardening layer from top to bottom.

5. The composite film of claim 4, wherein the second adhesive layer is an optically clear adhesive (OCA); and the attachment layer is a Polyethylene Terephthalate (PET) film or a Polycarbonate (PC) film.

6. The composite film of claim 5, wherein a thickness of the second adhesive layer is within a range of 15 µm-35 µm; and a thickness of the attachment layer is within a range of 30 µm-70 µm.

7. The composite film of claim 1, wherein different parts by weight ratios of the non-Newtonian fluid material to the adhesive in the composite film cause the composite film to have different properties, and the different properties include transient impact resistance, long term usability, and flexibility.

8. The composite film of claim 1, wherein the non-Newtonian fluid material further includes a first reinforcing agent, and the first reinforcing agent includes carbon nanotubes or graphene sheets.

9. The composite film of claim 8, wherein the first reinforcing agent is directionally aligned within the non-Newtonian fluid material by a magnetic field.

10. The composite film of claim 1, wherein the adhesive further includes a second reinforcing agent, and the second reinforcing agent includes at least one of an antioxidant or an anti-UV agent.

11. The composite film of claim 1, wherein the composite film further includes a performance monitoring layer, and the performance monitoring layer includes at least one of a piezoelectric film, carbon nanotubes, or graphene;
    the performance monitoring layer is configured to generate an electrical signal when being subjected to an impact force and send the electrical signal to a processing component;
    the processing component is configured to record a count of the impact force to which the performance monitoring layer being subjected and the electrical signal generated by each impact force to which the performance monitoring layer being subjected; and
    the processing component and the performance monitoring layer are electrically connected.

12. The composite film of claim 11, wherein the processing component is further configured to:
    determine a performance decay index of the composite film based on the count of the impact force to which the performance monitoring layer being subjected and the electrical signal generated by the each impact force to which the performance monitoring layer being subjected, and the performance decay index is used to measure an extent to which performance of the composite film declines over time.

13. The composite film of claim 12, wherein the determine a performance decay index of the composite film includes:
    determine, based on the electrical signal generated by each impact force to which the performance monitoring layer being subjected, an energy of the impact force to which the performance monitoring layer being subjected; and
    determine, based on the count of the impact force to which the performance monitoring layer being subjected and the energy of the impact force to which the performance monitoring layer being subjected, the performance decay index of the composite film.

14. A method for preparing the composite film of claim 1, comprising:
    S0: coating the first adhesive layer onto the first protective layer to bond the first protective layer and the buffer elastic layer; and S1: coating the impact-hardening layer on the other side of the buffer elastic layer;
wherein in the S1, the coating the impact-hardening layer on the other side of the buffer elastic layer includes mixing and stirring the non-Newtonian fluid material and the adhesive to obtain a mixture and coating the mixture on the other side of the buffer elastic layer.

\* \* \* \* \*